United States Patent
Sato et al.

(10) Patent No.: US 6,550,369 B2
(45) Date of Patent: Apr. 22, 2003

(54) LINEAR ACTUATOR (75) Inventors: Toshio Sato, Tsukuba (JP); Shogo Miyazaki, Ibaraki-ken (JP); Yoshiteru Ueno, Ibaraki-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/948,040

(22) Filed: Sep. 7, 2001

(65) Prior Publication Data
US 2002/0047322 A1 Apr. 25, 2002

(30) Foreign Application Priority Data
Sep. 8, 2000 (JP) .................................... 2000-273877

(51) Int. Cl.[7] .............................................. F01B 29/00
(52) U.S. Cl. ................................ 92/59; 92/128; 92/164
(58) Field of Search ........................... 92/163, 164, 128, 92/59

(56) References Cited
U.S. PATENT DOCUMENTS

| 4,488,477 A | * | 12/1984 | Miyamoto | 92/85 R X |
|---|---|---|---|---|
| 4,744,287 A | * | 5/1988 | Miyamoto | 92/163 X |
| 4,798,128 A | * | 1/1989 | Mita | 92/59 |
| 5,305,682 A | * | 4/1994 | Kaneko | 92/164 |
| 5,613,421 A | * | 3/1997 | Abe | 92/165 R |
| 5,844,340 A | * | 12/1998 | Noda | 92/88 X |
| 6,148,714 A | * | 11/2000 | Abe et al. | 92/88 X |

* cited by examiner

Primary Examiner—F. Daniel Lopez
(74) Attorney, Agent, or Firm—Paul A. Guss (57) ABSTRACT

Each of end blocks is provided with a first pressure fluid communicating passage for communication between a first pressure fluid inlet/outlet port and a third pressure fluid inlet/outlet port, a second pressure fluid inlet/outlet port, and a second pressure fluid communicating passage which communicates with a second pressure fluid passage and a first pressure fluid passage communicating with a driving section. A passage of a sensor attachment rail communicates with the third pressure fluid inlet/outlet port and the second pressure fluid passage or the second pressure fluid passage and the third pressure fluid inlet/outlet port by the aid of piping studs.

9 Claims, 8 Drawing Sheets

LINEAR ACTUATOR

BACKGROUND OF THE INVENTION

1. Field of the Invention

The present invention relates to a linear actuator. In particular, the present invention relates to a linear actuator in which centralized piping can be achieved on either of a pair of end blocks.

2. Description of the Related Art

In conventional linear actuators of this type, the piping for supplying and discharging a pressure fluid acting on a piston is provided for each of a pair of right and left end blocks. Centralized piping is made on only either of the right and left end blocks. Therefore, it has been hitherto necessary to prepare two types of linear actuators, i.e., a linear actuator having a left side outlet port in which supplying and discharging piping passages are concentrated on the left end block, and a linear actuator having a right side outlet port in which supplying and discharging piping passages are concentrated on the right end block.

Substantial equipment investment is required since the two types of linear actuators, which have different outlet ports based on the one-side centralized piping, are prepared. Further, in this case, two types of end blocks, which use different positions of piping ports, are required. Therefore, the number of parts is increased, and it is difficult to reduce the cost of production and maintenance.

SUMMARY OF THE INVENTION

A general object of the present invention is to provide a linear actuator in which one-side centralized piping can be made on either of a pair of right and left end blocks by displacing an attachment position of a connecting member attached to the pair of right and left end blocks provided for the linear actuator, and the pair of right and left end blocks can be used commonly.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

In FIGS. 1 to 4, reference numeral 10 indicates a linear actuator 10 according to an embodiment of the present invention.

The linear actuator 10 basically comprises a driving section 12 which is composed of a magnet-based rodless cylinder, a slider 14 (movable member) which reciprocates linearly under the driving action of the driving section 12, a guide rail 16 (guide member) which guides the slider 14, a pair of end blocks 18a, 18b which are connected by screw members 20 to both end portions of the guide rail 16 respectively, and a sensor attachment rail 22 (connecting member) which is fixed to the pair of end blocks 18a, 18b respectively and which is arranged substantially in parallel to the guide rail 16.

Figure 1:
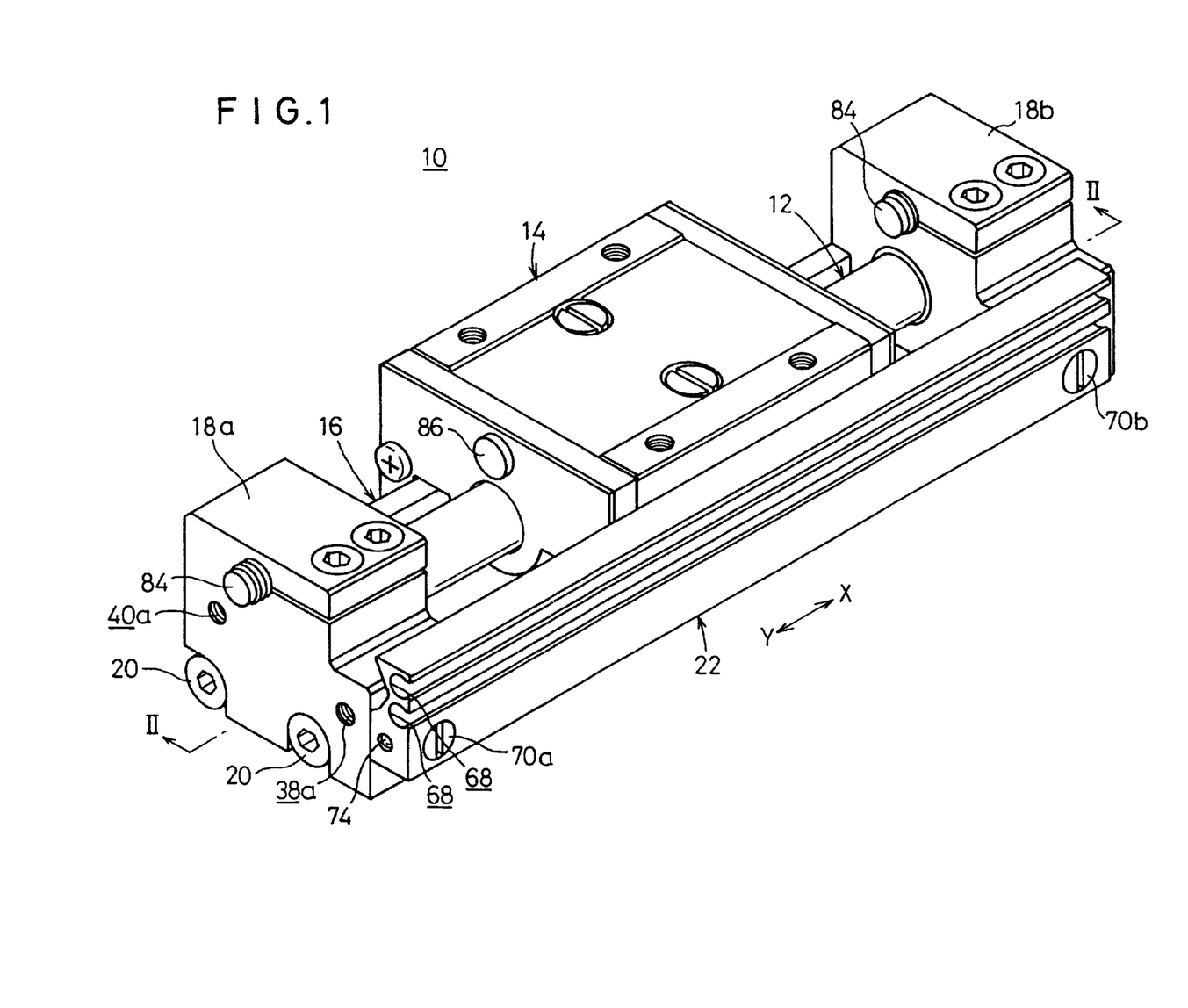
FIG. 1 is a perspective view schematically illustrating a linear actuator according to an embodiment of the present invention.
Figure 2:
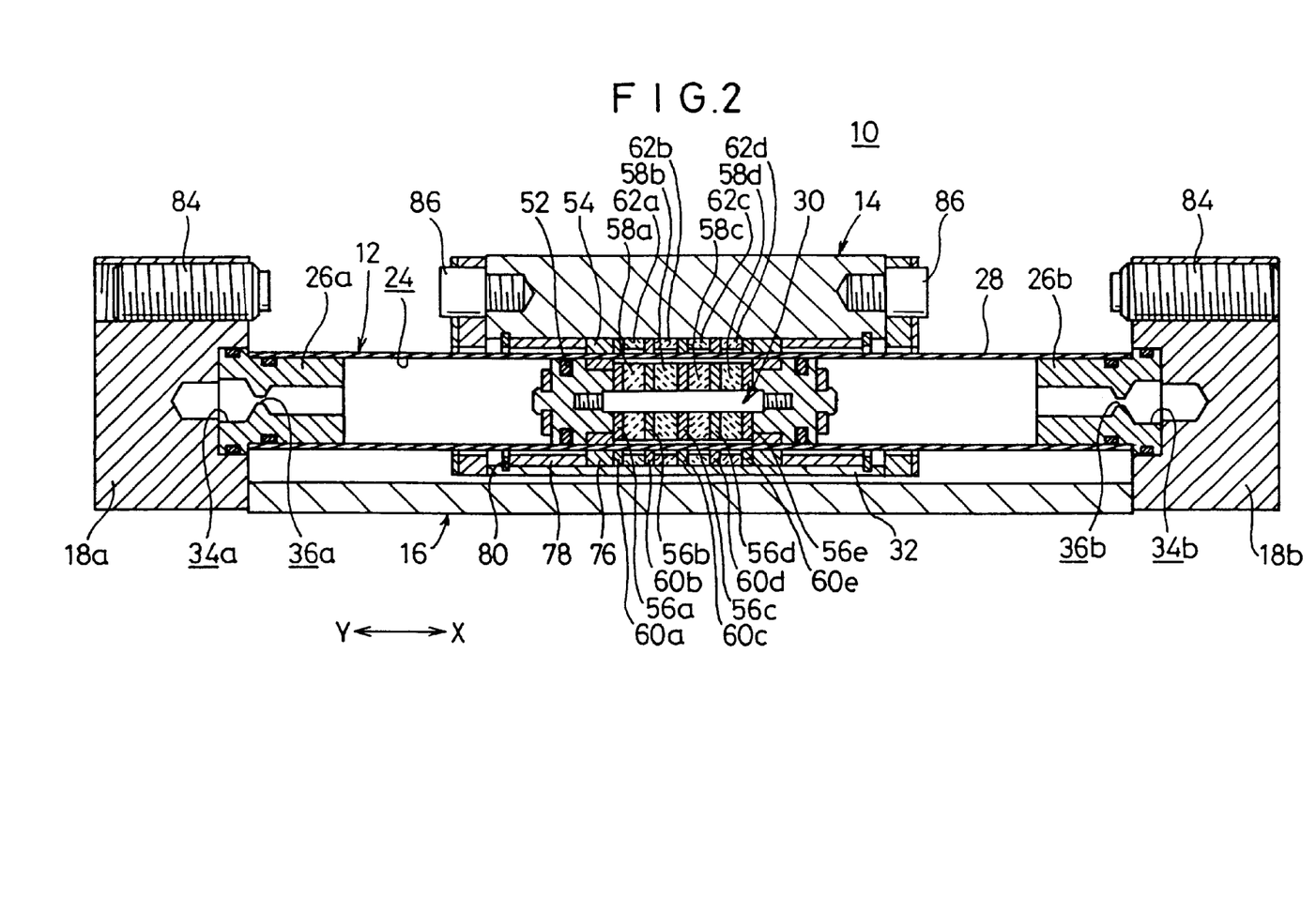
FIG. 2 is a longitudinal sectional view taken along a line II—II shown in FIG. 1.

As shown in FIG. 2, the driving section 12 includes a cylindrical member 28, a piston 30, and a slide block 32. The cylindrical member 28 has a through-hole 24 which functions as a cylinder chamber. The cylindrical member 28 is supported by the pair of end blocks 18a, 18b by the aid of end caps 26a, 26b inserted in both end portions of the through hole 24 respectively. The piston 30 is formed of a magnetic material and slidably fitted to the through-hole 24 in the cylindrical member 28. The slide block 32 surrounds the outer circumferential surface of the cylindrical member 28. The slide block 32 is displaceable in the axial direction of the cylindrical member 28 in unison with the piston 30.

Orifices 36a, 36b, which throttle the flow rate of the fluid flowing through passages 34a, 34b, are formed in the end caps 26a, 26b. The passages 34a, 34b are provided to make communication with fourth pressure fluid inlet/outlet ports 48a, 48b (see FIG. 3) which is formed in the end caps 26a, 26b as described later on.

Figure 3:
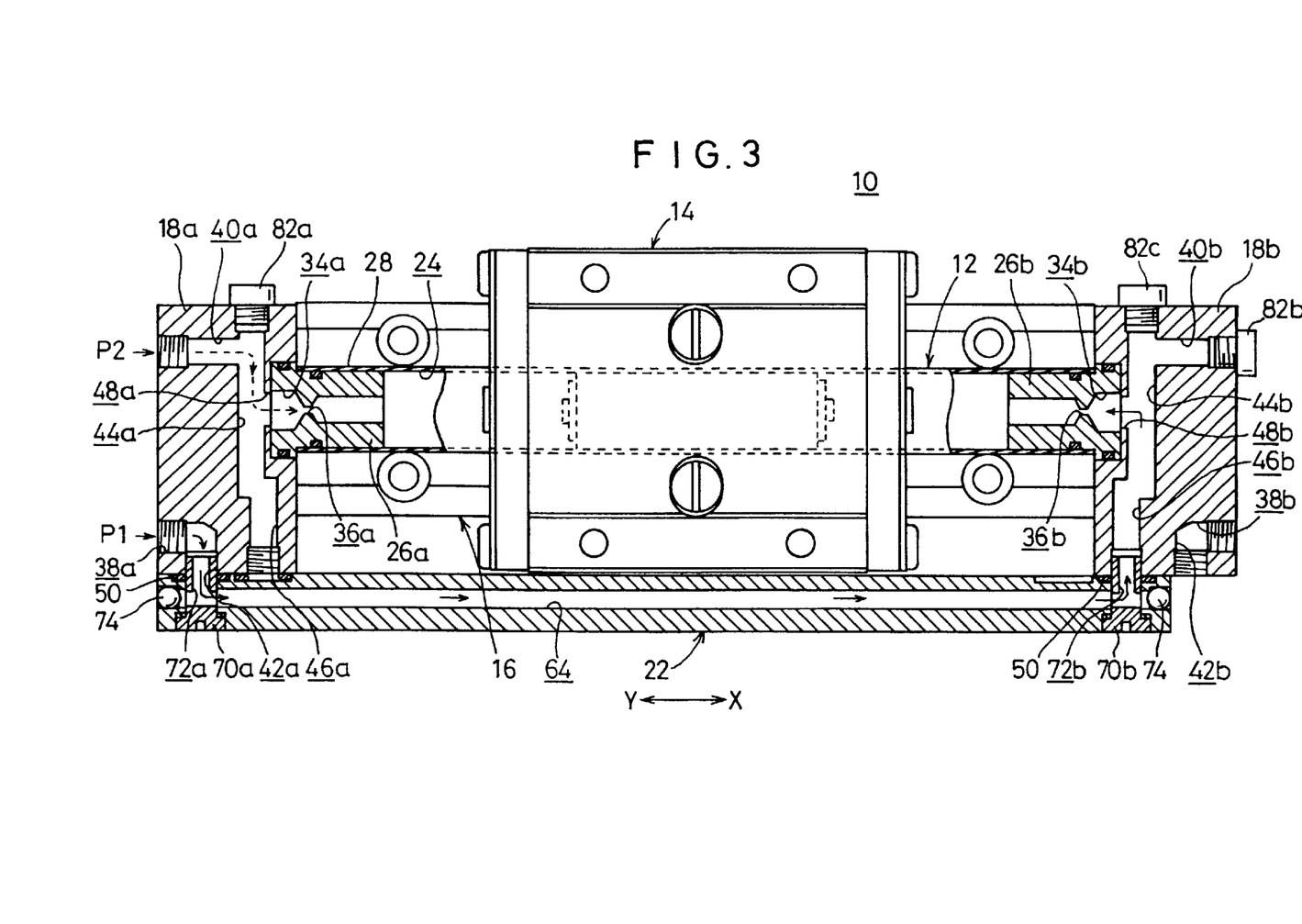
FIG. 3 is, with partial cutout, a plan view illustrating the linear actuator shown in FIG. 1.

As shown in FIG. 3, the end blocks 18a, 18b are formed with first pressure fluid inlet/outlet ports 38a, 38b and second pressure fluid inlet/outlet ports 40a, 40b which are substantially in parallel to the axis of the cylindrical member 28, and third pressure fluid inlet/outlet ports 42a, 42b which are disposed substantially perpendicularly to the first pressure fluid inlet/outlet ports 38a, 38b to make communication therewith.

Further, first pressure fluid passages 44a, 44b are formed, which are disposed substantially perpendicularly to the second pressure fluid inlet/outlet ports 40a, 40b to make communication therewith. The first pressure fluid passages 44a, 44b communicate with the through-hole 24 of the cylindrical member 28.

Second pressure fluid passages 46a, 46b are formed substantially in parallel to the third pressure fluid inlet/outlet ports 42a, 42b respectively, and they communicate with the first pressure fluid passages 44a, 44b. The fourth pressure fluid inlet/outlet ports 48a, 48b, which communicate with the passages 34a, 34b, are connected to the first pressure fluid passages 44a, 44b respectively.

In this arrangement, the first pressure fluid inlet/outlet ports 38a, 38b and the third pressure fluid inlet/outlet ports 42a, 42b, which communicate with each other, function as the first pressure fluid communicating passage. Further, the second pressure fluid inlet/outlet ports 40a, 40b, the first pressure fluid passages 44a, 44b, and the second pressure fluid passages 46a, 46b function as the second pressure fluid communicating passage. Reference numeral 50 indicates a seal ring.

As shown in FIG. 2, wear rings 52 and scrapers 54 are installed to both end portions of the piston 30 in the axial direction respectively. A first yoke, which is composed of five annular plates 56a to 56e formed of magnetic members, is externally fitted to the outer circumferential surface of the piston 30. Ring-shaped inner magnets 58a to 58d are interposed between the adjoining annular plates 56a to 56e respectively.

A second yoke, which is constructed by a plurality of divided annular plates 60a to 60e composed of magnetic members, is internally fitted to the inner circumferential surface of the slide block 32. Ring-shaped outer magnets 62a to 62d are interposed between the adjoining annular plates 60a to 60e respectively. The annular plates 60a to 60e and the ring-shaped outer magnets 62a to 62d are fastened to the inner circumferential surface of the slide block 32 by retaining rings 80 by the aid of wear rings 76 and spacers 78.

In this arrangement, the inner magnets 58a to 58d installed to the piston 30 and the outer magnets 62a to 62d installed to the slide block 32 are arranged so that they are opposed to one another with the cylindrical member 28 intervening therebetween respectively. Further, their magnetic poles are set so that they are attracted to one another.

As shown in FIG. 3, a passage 64, which extends in the axial direction, is formed in the sensor attachment rail 22. The passage 64 is provided to make communication with the third pressure fluid inlet/outlet port 42a of the end block 18a and the second pressure fluid passage 46b of the end block 18b respectively by the aid of piping studs 70a, 70b which are fitted to a pair of holes formed on the lower side of a sensor attachment long groove 68 (see FIG. 1) respectively.

Both ends of the passage 64 formed in the sensor attachment rail 22 are closed in an air-tight manner by steel balls 74 respectively. Reference numeral 84 (see FIG. 2) indicates screw members which are screw-fastened to the end blocks 18a, 18b. The displacement amount of the slider 14 is adjusted by increasing/decreasing the screwing amount of the screw member 84. Elastic members 86 (see FIG. 2), which are screw-fastened to the slider 14, effect the buffering function when the screw members 84 make abutment thereagainst.

The linear actuator 10 according to the embodiment of the present invention is basically constructed as described above. Next, its operation, function, and effect will be explained.

At first, it is assumed that the one-side centralized piping for supplying and discharging the pressure fluid is effected for the first end block 18a disposed on the left side.

With reference to FIG. 3, the first pressure fluid passage 44a of the end block 18a, and the second pressure fluid inlet/outlet port 40b and the first pressure fluid passage 44b of the end block 18b are closed by plugs 82a to 82c respectively.

On the other hand, the piping studs 70a, 70b are screw-fastened to the third pressure fluid inlet/outlet port 42a of the end block 18a and the second pressure fluid passage 46b of the end block 18b respectively. The third pressure fluid inlet/outlet port 42a and the second pressure fluid passage 46b communicate with each other via the passage 64 of the sensor attachment rail 22.

Accordingly, the first pressure fluid inlet/outlet port 38a of the end block 18a communicates with the passage 34b of the end cap 26b via the third pressure fluid inlet/outlet port 42a, the communicating passage 72a of the piping stud 70a, the passage 64 of the sensor attachment rail 22, and the communicating passage 72b of the piping stud 70b, and via the second and first pressure fluid passages 46b, 46b and the fourth pressure fluid inlet/outlet port 48b of the end block 18b.

On the other hand, the second pressure fluid inlet/outlet port 40a of the end block 18a communicates with the passage 34a of the end cap 26a via the first pressure fluid passage 44a and the fourth pressure fluid inlet/outlet port 48a.

The pressure fluid, for example, compressed air, which is supplied from an unillustrated pressure fluid supply source, is introduced from the piping port P1 into the first pressure fluid inlet/outlet port 38a of the end block 18a. The second pressure fluid inlet/outlet port 40a of the end block 18a is open to the atmospheric air under the action of an unillustrated directional control valve.

The supplied compressed air passes from the first pressure fluid inlet/outlet port 38a through the third pressure fluid inlet/outlet port 42a, the communicating passage 72a of the piping stud 70a, the passage 64 of the sensor attachment rail 22, and the communicating passage 72b of the piping stud 70b. The compressed air passes through the second and first pressure fluid passages 46b, 44b and the fourth pressure fluid inlet/outlet port 48b, and it is introduced from the passage 34b and the orifice 36b into the first end portion of the through-hole 24 of the cylindrical member 28 which functions as the cylinder chamber.

On the other hand, the second end portion of the through-hole 24 as the cylinder chamber is open to the atmospheric air via the orifice 36a, the passage 34a, the fourth pressure fluid inlet/outlet port 48a, and the first pressure fluid passage 44a, and via the second pressure fluid inlet/outlet port 40a.

Accordingly, the piston 30 is pressed under the action of the compressed air introduced into the through-hole 24 of the cylindrical member 28. The inner magnets 58a to 58d and the piston 30 are displaced integrally in the direction of the arrow Y (see FIG. 3) along the through-hole 24 of the cylindrical member 28 by the aid of the first yoke composed of the annular plates 56a to 56e. During this process, the outer magnets 62a to 62d are attracted under the action of the magnetic fields of the inner magnets 58a to 58d installed to the piston 30 by the aid of the first yoke. The slide block 32, which retains the outer magnets 62a to 62d, is displaced integrally with the piston 30.

When the compressed air is supplied from the piping port P2 to the second pressure fluid inlet/outlet port 40a to open the first pressure fluid inlet/outlet port 38a to the atmospheric air, the compressed air in the flow passages for supplying and discharging flows in the opposite directions, and the compressed air is introduced into the through-hole 24 of the cylindrical member 28. Therefore, the piston 30 and the slide block 32 are displaced integrally in the direction of the arrow X shown in FIG. 3.

As described above, when the first pressure fluid inlet/outlet port 38a and the second pressure fluid inlet/outlet port 40a formed in the end block 18a are open to the atmospheric air for the supply and the discharge of the compressed air under the action of the unillustrated directional control valve respectively, the piston 30 and the slide block 32 are integrally displaced linearly. Thus, the reciprocating motion of the slider 14 is carried out.

Next, it is assumed that the flow passages are changed to effect the one-side centralized piping for supplying and discharging the pressure fluid for the second end block 18b disposed on the right side, by further displacing the sensor attachment rail 22 in the direction of the arrow X from the position shown in FIG. 3.

Figure 4:
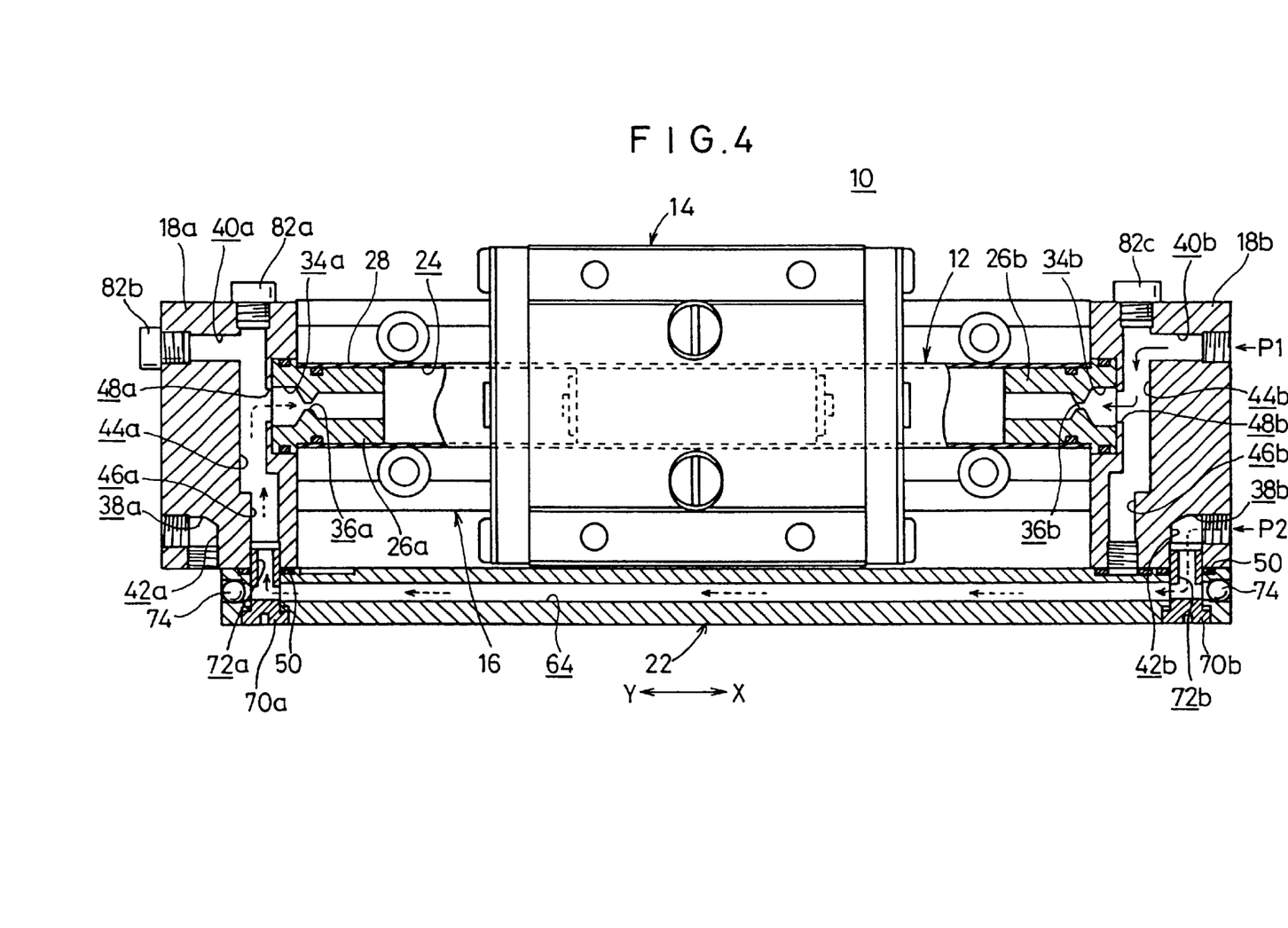
FIG. 4 is, with partial cutout, a plan view illustrating a state in which an attachment position of a sensor attachment rail shown in FIG. 3 is displaced in the rightward direction.

FIG. 4 shows a state in which the piping studs 70a, 70b are screw-fastened to the second pressure fluid passage 46a of the end block 18a and the third pressure fluid inlet/outlet port 42b of the end block 18b respectively to displace the sensor attachment rail 22 in the rightward direction.

In this arrangement, the second pressure fluid inlet/outlet port 40a and the first pressure fluid passage 44a of the end block 18a and the first pressure fluid passage 44b of the end block 18b are closed by the plugs 82a to 82c respectively. Practically, the plug 82b installed to the end block 18b is simply detached to install it to the end block 18a disposed on the opposite side.

The second pressure fluid passage 46a of the end block 18a and the third pressure fluid inlet/outlet port 42b of the end block 18b communicate with the passage 64 of the sensor attachment rail 22 by the aid of the piping studs 70a, 70b.

The first pressure fluid inlet/outlet port 38b of the end block 18b communicates with the passage 34a of the end cap 26a via the communicating passage 72b of the piping stud 70b and the passage 64 of the sensor attachment rail 22, and via the communicating passage 72a of the piping stud 70a and the second and first pressure fluid passages 46a, 44a and the fourth pressure fluid inlet/outlet port 48a of the end block 18a.

The second pressure fluid inlet/outlet port 40b of the end block 18b communicates with the passage 34b of the end cap 26b by the first pressure fluid passage 44b and the fourth pressure fluid inlet/outlet port 48b.

The compressed air is supplied from the piping port P1 to the second pressure fluid inlet/outlet port 40b of the end block 18b. The first pressure fluid inlet/outlet port 38b of the end block 18b is open to the atmospheric air under the action of the unillustrated directional control valve.

The supplied compressed air passes from the second pressure fluid inlet/outlet port 40b through the first pressure fluid passage 44b and the fourth pressure fluid inlet/outlet port 48b, and it is introduced from the passage 34b into the first end portion of the through-hole 24 as the cylinder chamber. The second end portion as the cylinder chamber is open to the atmospheric air via the passage 34a, the fourth pressure fluid inlet/outlet port 48a, and the first and second pressure fluid passages 44a, 46a, via the communicating passage 72a of the piping stud 70a, the passage 64 of the sensor attachment rail 22, and the communicating passage 72b of the piping stud 70b, and via the first pressure fluid inlet/outlet port 38b.

Accordingly, the piston 30 is pressed under the action of the compressed air introduced into the through-hole 24 of the cylindrical member 28. The inner magnets 58a to 58d and the piston 30 are displaced in the direction of the arrow Y by the aid of the annular plates 56a to 56e.

When the compressed air is supplied from the piping port P2, and the piping port P1 is open to the atmospheric air, the compressed air in the passages for supplying and discharging flows in the opposite directions, and the compressed air is introduced into the through-hole 24 of the cylindrical member 28. Accordingly, the slide block 32 and the piston 30 are displaced integrally in the direction of the arrow X shown in FIG. 4.

Accordingly, when the first pressure fluid inlet/outlet port 38b and the second pressure fluid inlet/outlet port 40b formed in the end block 18b are open to the atmospheric air for the supply and the discharge of the compressed air under the action of the unillustrated directional control valve respectively, the piston 30 and the slide block 32 are integrally displaced linearly. Thus, the reciprocating motion of the slider 14 is carried out.

In the embodiment of the present invention, the third pressure fluid inlet/outlet port 42b and the second pressure fluid passage 46a communicate with each other via the passage 64 by displacing the sensor attachment rail 22 in the rightward direction as shown in FIG. 4, and screw-fastening the piping studs 70a, 70b to the second pressure fluid passage 46a of the end block 18a and the third pressure fluid inlet/outlet port 42b of the end block 18b respectively.

As described above, the piping studs 70a, 70b have the function to attach the sensor attachment rail 22 to the end blocks 18a, 18b.

Further, the communicating passages 72a, 72b, which are formed in the piping studs 70a, 70b, have the function to make communication with the passage 64 of the sensor attachment rail 22 for the third pressure fluid inlet/outlet port 42a of the end block 18a and the second pressure fluid passage 46b of the end block 18b and for the second pressure fluid passage 46a of the end block 18a and the third pressure fluid inlet/outlet port 42b of the end block 18b respectively.

Therefore, in the embodiment of the present invention, the centralized piping can be concentrated on either of the end blocks 18a, 18b by only displacing the attachment position of the sensor attachment rail 22. Accordingly, the piping is simplified, and it is possible to shorten the time required for the piping operation.

Next, a linear actuator 90 according to another embodiment of the present invention is shown in FIGS. 5 to 8. The same components of the linear actuator 90 as the components shown in FIGS. 1 to 4 described above are designated by the same reference numerals, detailed explanation of which will be omitted.

Figure 5:
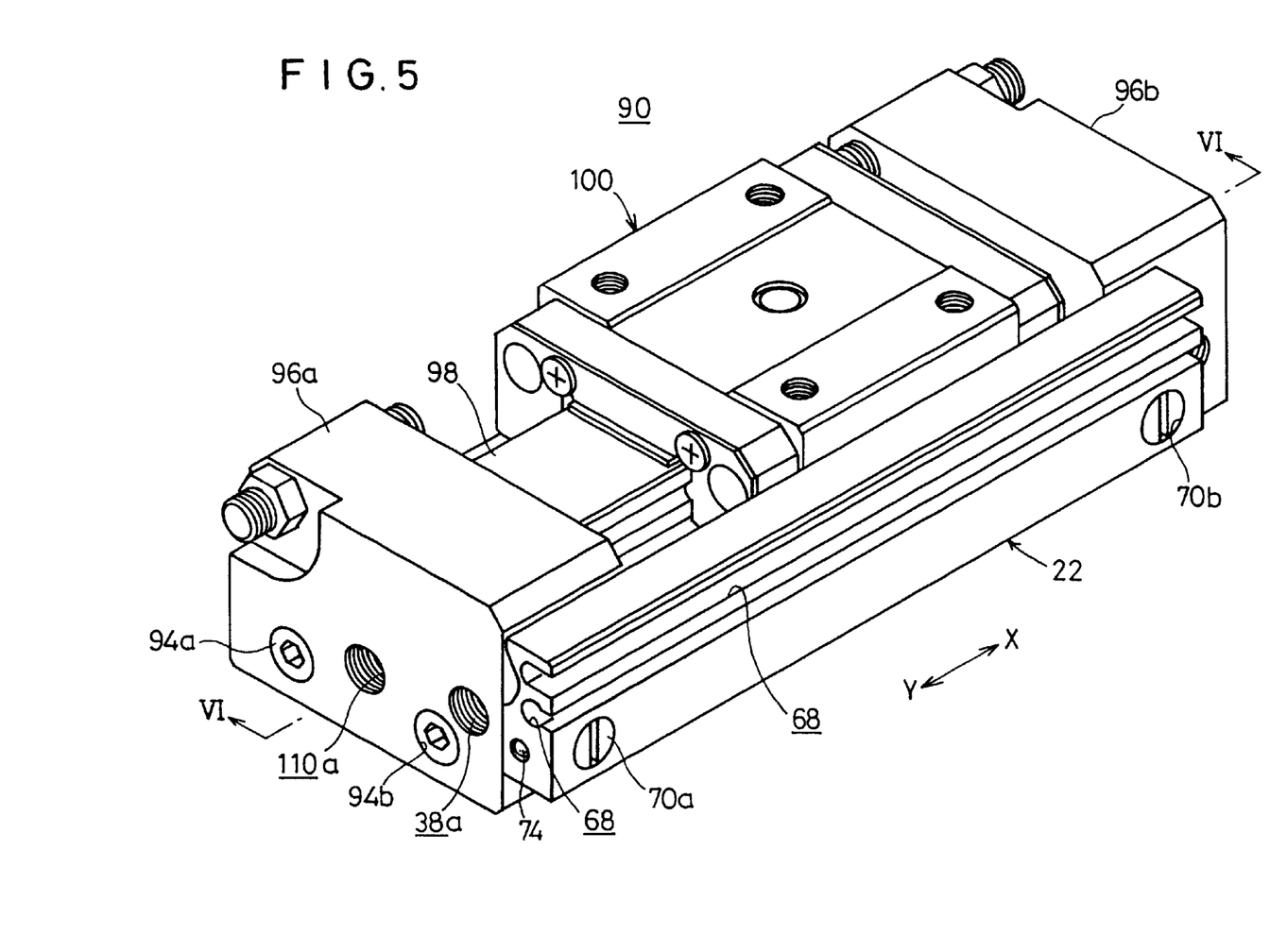
FIG. 5 is a perspective view schematically illustrating a linear actuator according to another embodiment of the present invention.

With reference to FIG. 5, the linear actuator 90 comprises a body 92 (guide member) (see FIG. 6) which has a rectangular parallelepiped configuration, a pair of end blocks 96a, 96b which are connected to both end portions of the body 92 in the longitudinal direction by the aid of screw members 94a, 94b, and a slide table 100 (movable member) which makes linear reciprocating motion along a guide section 98 formed in an integrated manner while being exposed over the upper surface of the body 92.

Figure 6:
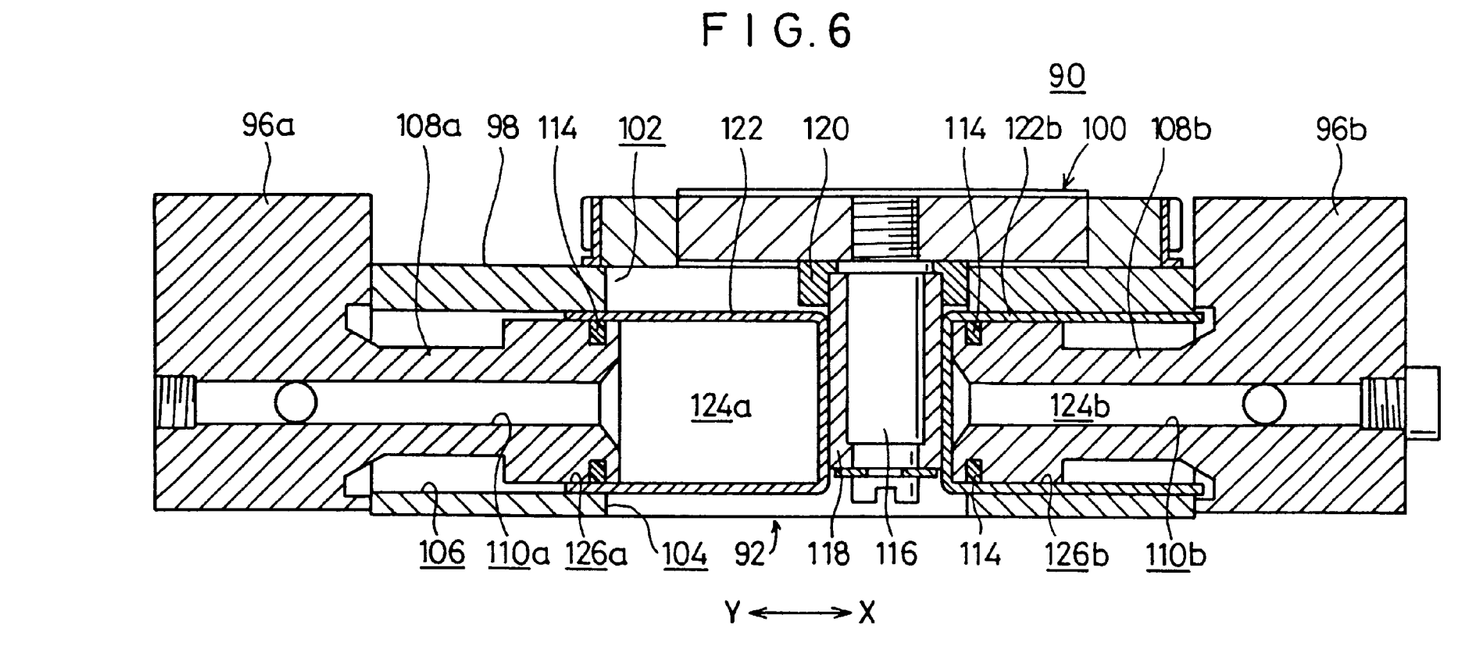
FIG. 6 is a longitudinal sectional view taken along a line VI—VI shown in FIG. 5.

As shown in FIG. 6, a first opening 102, which has a substantially elliptic configuration in order to displace a joint member 118 as described later on, is formed in the guide section 98 disposed along the upper surface of the body 92. A second opening 104 is formed at the bottom surface of the body 92. Further, a through-hole 106 having a substantially circular cross section, which communicates with the first and second openings 102, 104 respectively, is formed in the axial direction in the body 92.

Figure 7:
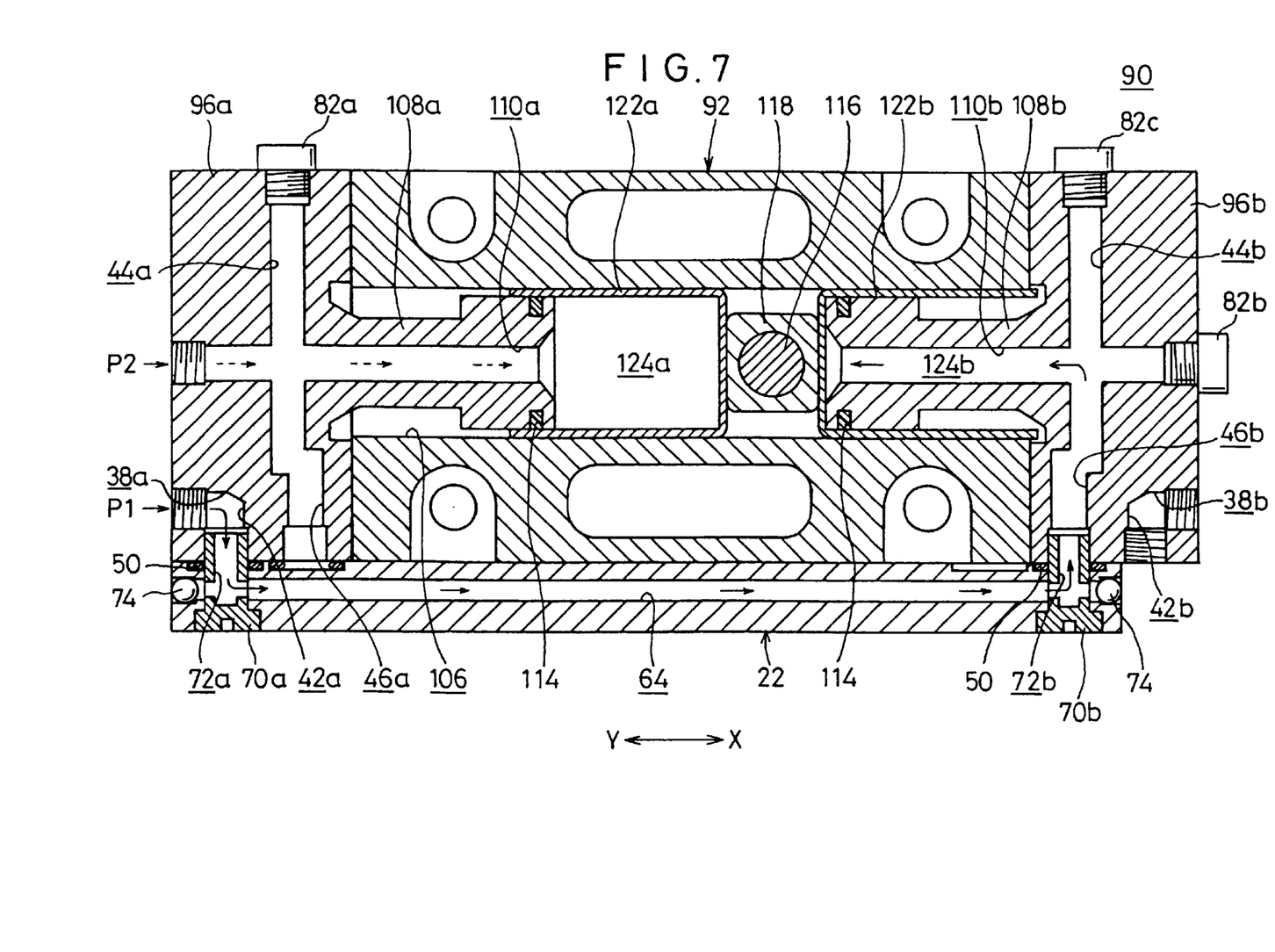
FIG. 7 is a schematic lateral sectional view illustrating the linear actuator shown in FIG. 5.

As shown in FIGS. 6 and 7, cylindrical sections 108a, 108b, which protrude along the through-hole 106 formed in the body 92, are formed for the respective end blocks 96a, 96b. Holes 110a, 110b, which make penetration in the axial direction, are formed in the cylindrical sections 108a, 108b.

Seal members 114 are fitted to the outer circumferential surfaces of the cylindrical sections 108a, 108b by the aid of annular grooves. The seal members 114 make sliding contact with cap members 122a, 122b as described later on, and thus the seal members 114 function to retain, in an air-tight manner, pressure chambers 124a, 124b which are closed by the cap members 122a, 122b as described later on.

A bolt member 116 having a columnar configuration is screw-fastened to the slide table 100 in a direction perpendicular to the bottom surface portion thereof. An angular barrel-shaped joint member 118 is externally fitted to the outer circumferential surface of the bolt member 116. A damper member 120 having a substantially rectangular cross section is installed to the outer circumferential surface at one end of the joint member 118. The damper member 120 is displaceable integrally with the slide table 100, the bolt member 116, and the joint member 118, and it has a buffering function by making abutment against the inner wall surface of the first opening 102.

A pair of cap members 122a, 122b, which extend in the axial direction of the through-hole 106 and each of which has a bottom-equipped cylindrical configuration, are arranged and opposed to one another on side wall surfaces of the joint member 118. The joint member 118 is retained in a surface-to-surface contact manner in a state in which the joint member 118 does not forcibly contact with the cap members 122a, 122b.

Pressure chambers 124a, 124b, each of which is formed by the cap member 122a, 122b and the cylindrical section 108a, 108b, communicate with the holes 110a, 110b which penetrate through the cylindrical sections 108a, 108b. In this arrangement, the pressure fluid is supplied to the pressure chamber 124a, 124b via the hole 110a, 110b, and thus the pressure fluid presses the inner wall surface of the cap member 122a, 122b.

Accordingly, the cap members 122a, 122b are slidably displaceable along annular gaps 126a, 126b which are formed by the through-hole 106 of the body 92 and the outer circumferential surfaces of the cylindrical sections 108a, 108b. When the cap members 122a, 122b are displaced along the outer circumferential surfaces of the cylindrical sections 108a, 108b, the slide table 100 makes the reciprocating motion in the direction of the arrow X or Y by the aid of the joint member 118 which is interposed by the cap members 122a, 122b in the surface-to-surface contact manner. In this arrangement, the cylindrical sections 108a, 108b, the seal members 114, the bolt member 116, the joint member 118, and the cap members 122a, 122b function as the driving section for making the reciprocating motion of the slide table 100 in the direction of the arrow X or Y.

The linear actuator 90 according to the another embodiment of the present invention is basically constructed as described above. Next, its operation, function, and effect will be explained.

At first, it is assumed that the one-side centralized piping for supplying and discharging the pressure fluid is effected for the first end block 96a disposed on the left side.

With reference to FIG. 7, the first pressure fluid passage 44a of the end block 96a, the first pressure fluid passage 44b of the end block 96b, and the first end of the hole 110b open to the end block 96b are closed by plugs 82a to 82c.

Further, the piping studs 70a, 70b are screw-fastened to the third pressure fluid inlet/outlet port 42a of the end block 96a and the second pressure fluid passage 46b of the end block 96b respectively. Accordingly, the third pressure fluid inlet/outlet port 42a and the second pressure fluid passage 46b communicate with each other via the passage 64 of the sensor attachment rail 22.

The first pressure fluid inlet/outlet port 38a of the end block 96a communicates with the hole 110b of the cylindrical section 108b via the communicating passage 72a of the piping stud 70a and the passage 64 of the sensor attachment rail 22, and via the communicating passage 72b of the piping stud 70b and the second and first pressure fluid passages 46b, 46b of the end block 96b. The hole 110a of the cylindrical section 108a communicates with the pressure chamber 124a of the cap member 122a.

The pressure fluid, for example, compressed air, which is supplied from an unillustrated pressure fluid supply source, is introduced into the hole 110a of the cylindrical section 108a from the piping port P2. The first pressure fluid inlet/outlet port 38a of the end block 96a is open to the atmospheric air under the action of an unillustrated directional control valve.

The supplied compressed air is introduced into the hole 110a of the cylindrical section 108a, and the compressed air is further supplied to the pressure chamber 124a which is closed by the cap member 122a to press the inner wall surface of the cap member 122a. Therefore, the cap member 122a is slidably displaced in the direction (direction of the arrow X) to make separation from the cylindrical section 108a, while maintaining the state in which the pressure chamber 124a is retained in the air-tight manner by the aid of the seal member 114. Accordingly, the cap member 122a presses the joint member 118, and thus the slide table 100 is displaced in the direction of the arrow X by the aid of the bolt member 116 installed and fitted to the joint member 118.

The pressure chamber 124b, which is closed by the cap member 122b, is open to the atmospheric air via the first pressure fluid inlet/outlet port 38a. The joint member 118 is displaced in the direction of the arrow X in unison with the slide table 100, while maintaining the state in which the joint member 118 is interposed by the cap members 122a, 122b.

When the compressed air is supplied from the piping port P1 to the first pressure fluid inlet/outlet port 38a under the action of the unillustrated directional control valve to open the hole 110a to the atmospheric air, the compressed air in the flow passages for supplying and discharging flows in the opposite directions, and the slide table 100 is displaced in the direction of the arrow Y as shown in FIG. 7.

Next, it is assumed that the flow passages are changed to effect the one-side centralized piping for supplying and discharging the pressure fluid for the second end block 96b disposed on the right side, by further displacing the sensor attachment rail 22 in the direction of the arrow X from the position shown in FIG. 7.

Figure 8:
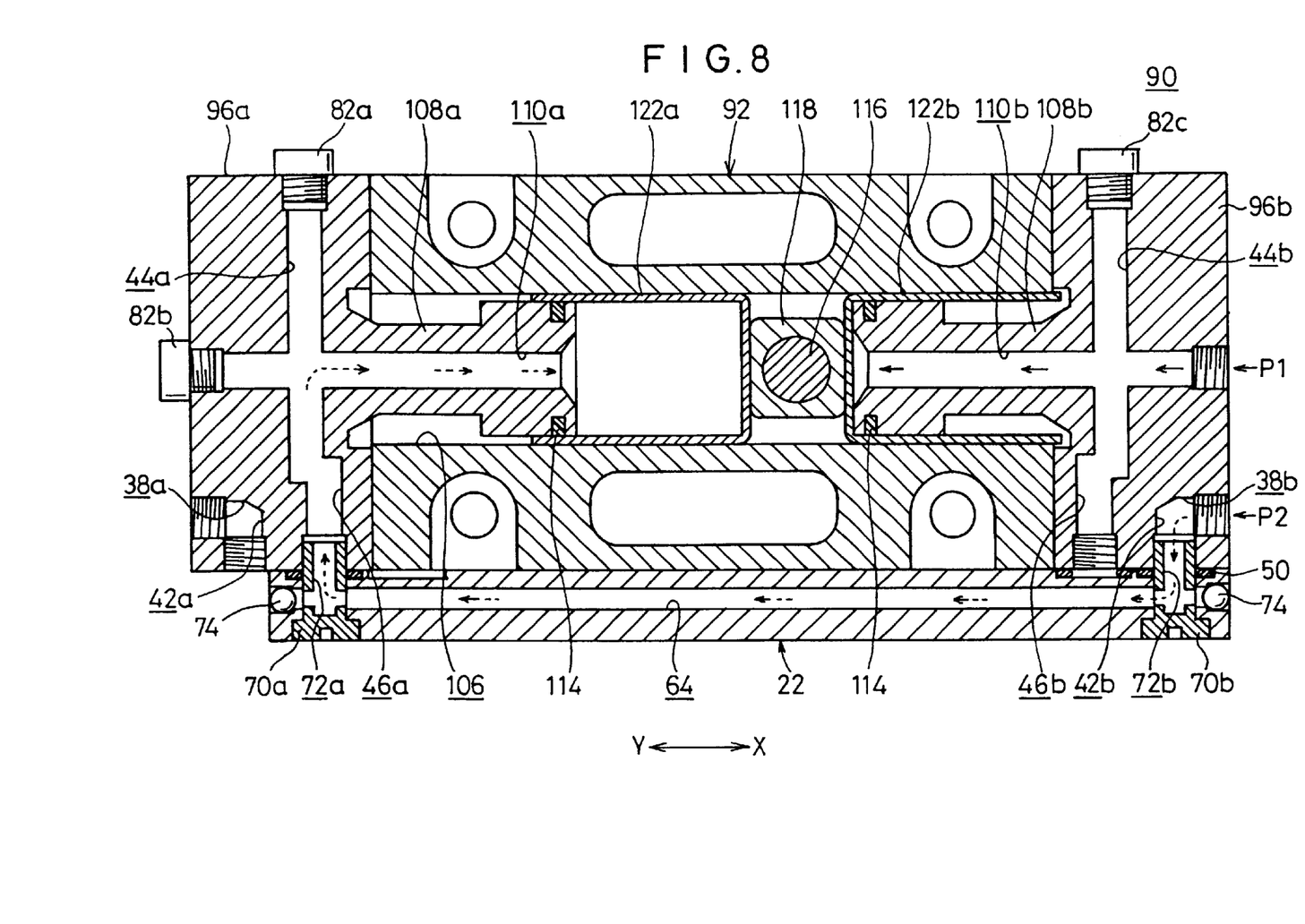
FIG. 8 is a schematic lateral sectional view illustrating a state in which an attachment position of a sensor attachment rail shown in FIG. 7 is displaced in the rightward direction.

FIG. 8 shows a state in which the piping studs 70a, 70b are screw-fastened to the second pressure fluid passage 46a of the end block 96a and the third pressure fluid inlet/outlet port 42b of the end block 96b respectively to displace the sensor attachment rail 22 in the rightward direction.

In this arrangement, the first pressure fluid passage 44a of the end block 96a, the first end of the hole 110a open to the end block 96a, and the first pressure fluid passage 44b of the end block 96b are closed by the plugs 82.

Further, the second pressure fluid passage 46a of the end block 96a and the third pressure fluid inlet/outlet port 42b of the end block 96b communicate with the passage 64 of the sensor attachment rail 22 via the piping studs 70a, 70b.

Accordingly, the hole 110b of the cylindrical section 108b formed in the end block 96b communicates with the pressure chamber 124b of the cap member 122b. The first pressure fluid inlet/outlet port 38b of the end block 96b communicates with the hole 110a of the cylindrical section 108a via the communicating passage 72b of the piping stud 70b, the passage 64 of the sensor attachment rail 22, and the communicating passage 72a of the piping stud 70a, and via the second and first pressure fluid passages 46a, 44a of the end block 96a.

The unillustrated compressed air is introduced from the piping port P2 into the first pressure fluid inlet/outlet port 38b. The hole 110b is in open to the atmospheric air under the action of the unillustrated directional control valve.

The supplied compressed air is introduced into the hole 110a of the cylindrical section 108a from the second and first pressure fluid passages 46a, 44a via the first pressure fluid inlet/outlet port 38b, the communicating passage 72b of the piping stud 70b, the passage 64 of the sensor attachment rail 22, and the communicating passage 72a of the piping stud 70a. Further, the compressed air is supplied to the pressure chamber 124a which is closed by the cap member 122a to press the inner wall surface of the cap member 122a. Therefore, the cap member 122a is slidably displaced in the direction (direction of the arrow X) to make separation from the cylindrical section 108a, while maintaining the state in which the pressure chamber 124a is retained in the air-tight manner by the aid of the seal member 114. Accordingly, the cap member 122a presses the joint member 118, and thus the slide table 100 is displaced in the direction of the arrow X by the aid of the bolt member 116 which is installed and fitted to the joint member 118.

The pressure chamber 124b, which is closed by the cap member 122b, is open to the atmospheric air via the hole 110b. The joint member 118 is displaced in the direction of the arrow X in unison with the slide table 100, while maintaining the state in which the joint member 118 is interposed by the cap members 122a, 122b.

When the compressed air is supplied from the piping port P1 to the hole 110b under the action of the unillustrated directional control valve, and the first pressure fluid inlet/outlet port 38b is open to the atmospheric air, the compressed air in the flow passages for supplying and discharging flows in the opposite directions, and the slide table 100 is displaced in the direction of the arrow Y as shown in FIG. 8.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A linear actuator comprising:

a driving section;

a movable member for making displacement under a driving action of said driving section;

a pair of end blocks connected to a first end and a second end of said driving section respectively and provided with a plurality of pressure fluid communicating passages communicating with pressure fluid inlet/outlet ports; and a connecting member formed with a passage in an axial direction and connected to said pair of end blocks at both ends thereof;

attachment members for alternately attaching said connecting member to said end blocks at respective positions that are shifted from each other by a predetermined distance in said axial direction, wherein said pressure fluid communicating passages communicating with said passage of said connecting member are switched to change flow passages by detaching said connecting member from one of said respective positions, displacing said connecting member by said predetermined distance in said axial direction and attaching said connecting member in another of said respective positions.

2. The linear actuator according to claim 1, wherein a piping outlet port for a pressure fluid is switched for said first end block and said second end block by displacing said connecting member by said predetermined distance in said axial direction.

3. The linear actuator according to claim 1, wherein said pressure fluid flow passages include a first pressure fluid communicating passage which has a first end connected to a passage for supplying and discharging a pressure fluid and a second end in communication with said passage of said connecting member, and a second pressure fluid communicating passage which has a first end connected to a passage for supplying and discharging said pressure fluid and a second end connected to said passage of said connecting member and in communication with said driving section.

4. The linear actuator according to claim 3, wherein said first pressure fluid communicating passage has a first pressure fluid inlet/outlet port which is formed in said axial direction, and a third pressure fluid inlet/outlet port which makes communication substantially perpendicularly with respect to said first pressure fluid inlet/outlet port.

5. The linear actuator according to claim 4, wherein said third pressure fluid inlet/outlet port communicates with said passage of said connecting member.

6. The linear actuator according to claim 3, wherein said second pressure fluid communicating passage has a second pressure fluid inlet/outlet port which is formed in said axial direction, a first pressure fluid passage which communicates substantially perpendicularly with said second pressure fluid inlet/outlet port and said driving section, and a second pressure fluid passage which communicates substantially in parallel with said first pressure fluid passage.

7. The linear actuator according to claim 5, wherein said second pressure fluid passage communicates with said passage of said connecting member.

8. The linear actuator according to claim 1, wherein said driving section displaces said movable member under an action of a magnetic field.

9. The linear actuator according to claim 1, wherein said driving section displaces said movable member by pressing said movable member with a pressure fluid.

* * * * *